April 15, 1952
C. J. CADWELL ET AL
2,593,007
SLIDE FEEDING MECHANISM FOR STILL
PICTURE PROJECTION MACHINES
Filed Feb. 9, 1949
6 Sheets-Sheet 3
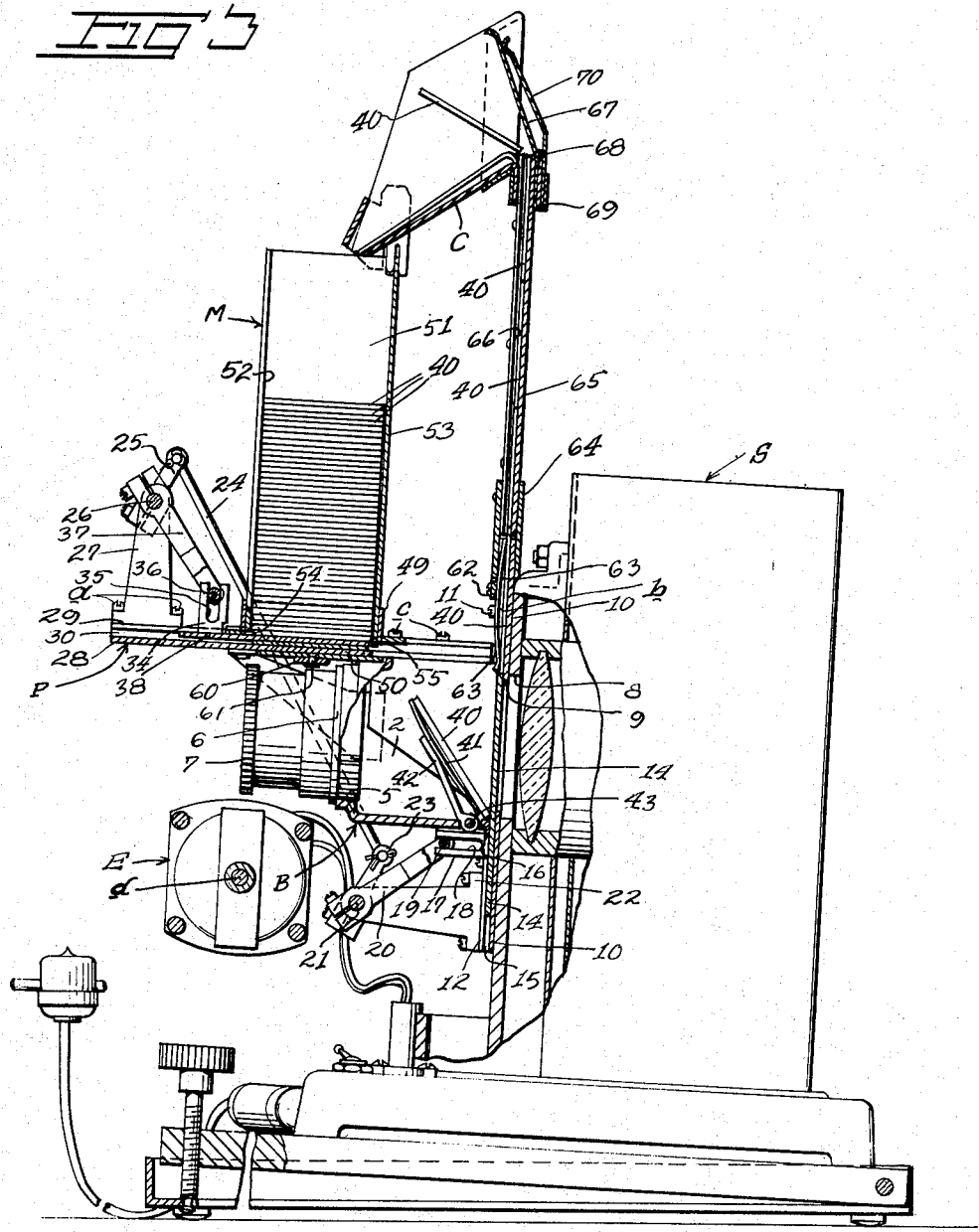
INVENTORS
Clarence J. Cadwell
Frank M. Adamson
BY
Attorney April 15, 1952
C. J. CADWELL ET AL
2,593,007
SLIDE FEEDING MECHANISM FOR STILL
PICTURE PROJECTION MACHINES
Filed Feb. 9, 1949
6 Sheets-Sheet 4
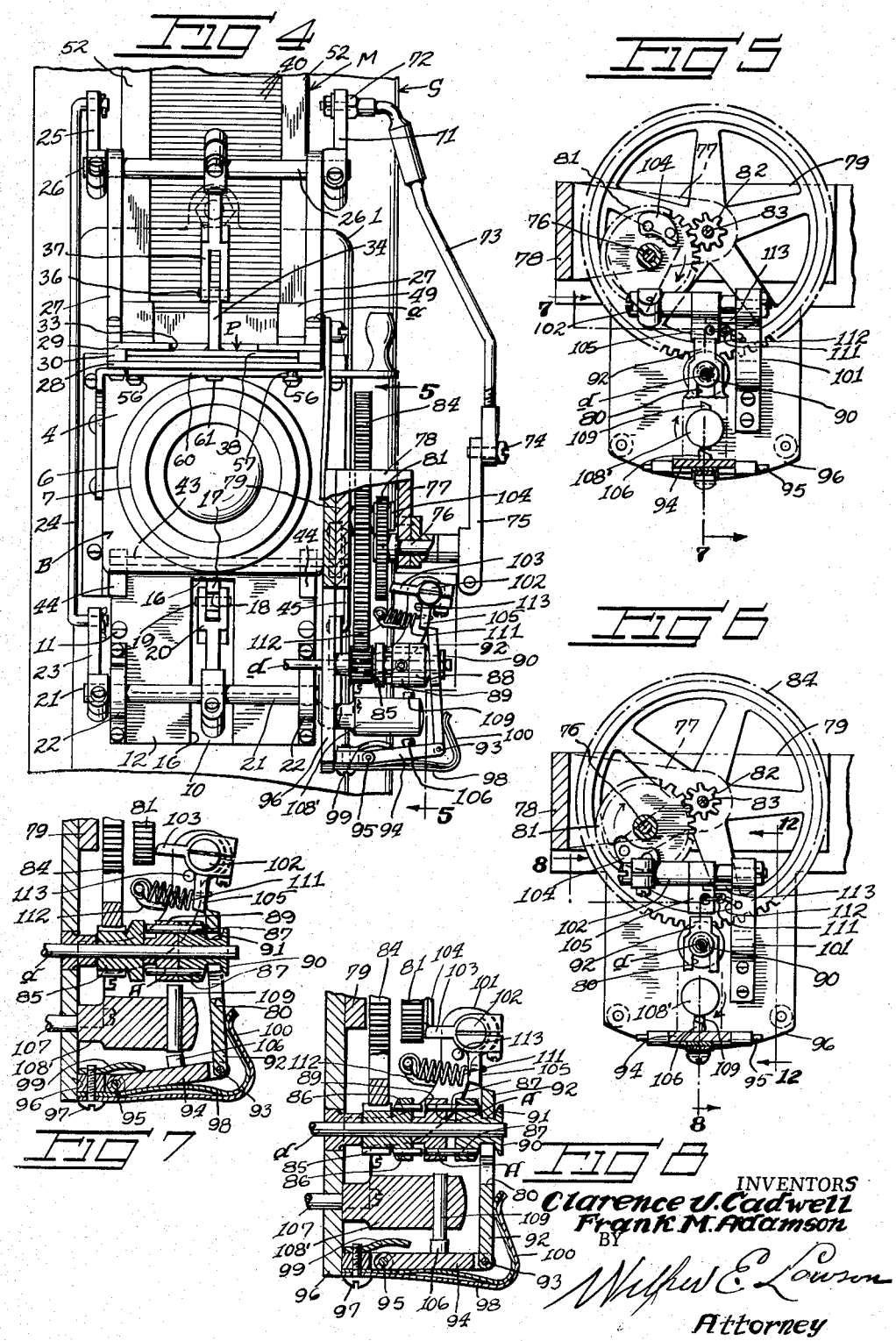
INVENTORS
Clarence J. Cadwell
Frank M. Adamson
BY
Wilbur E. Lawson
Attorney

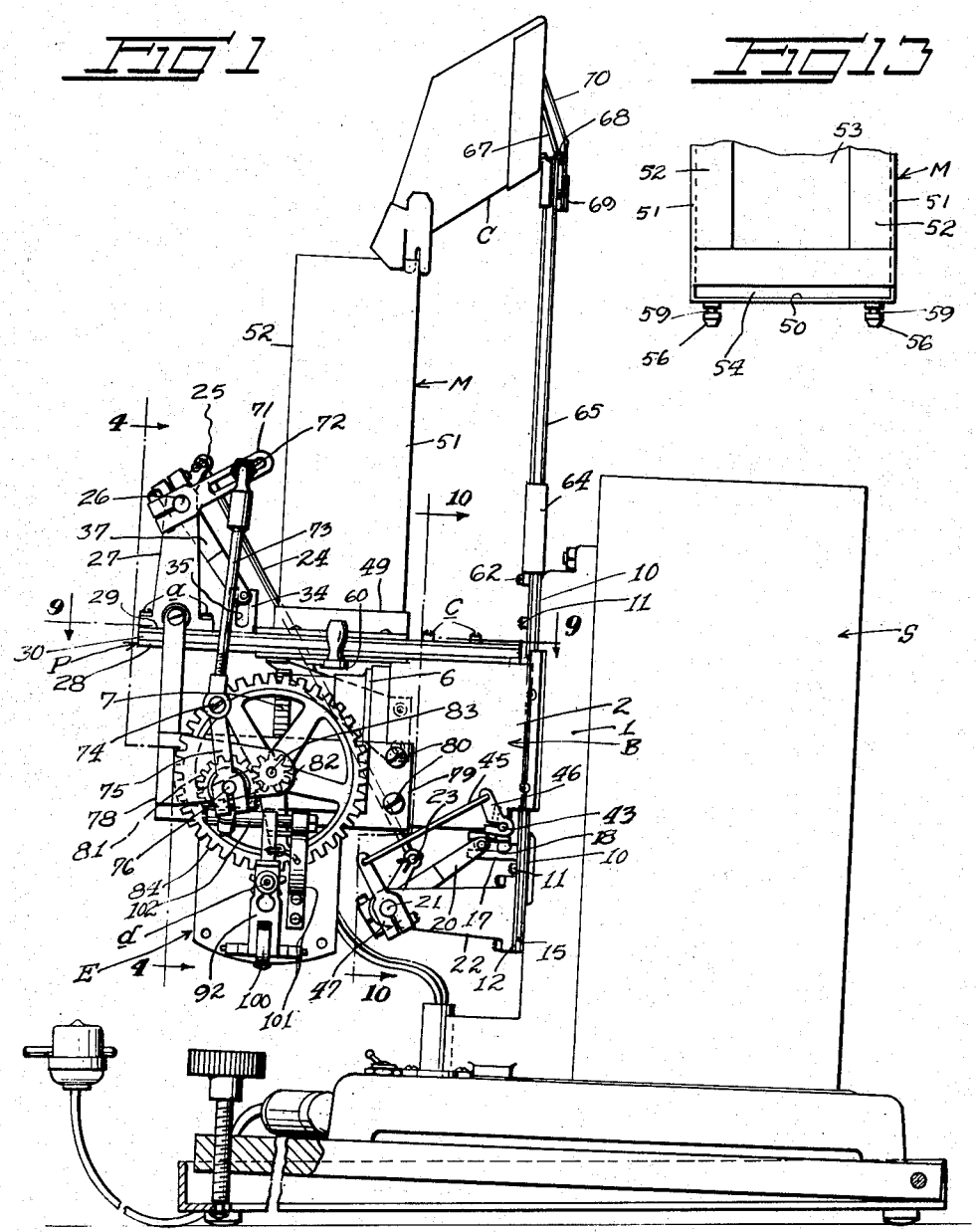

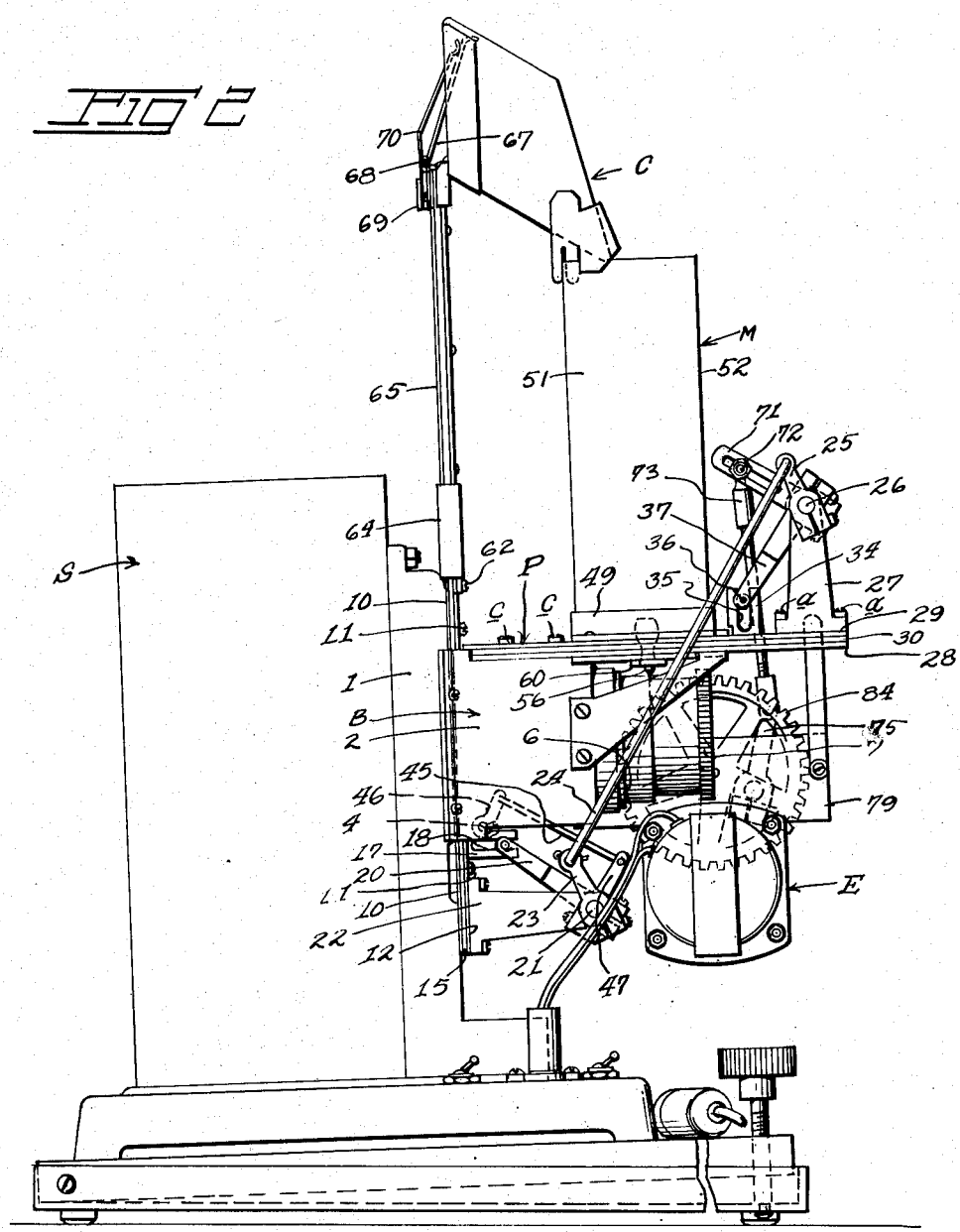

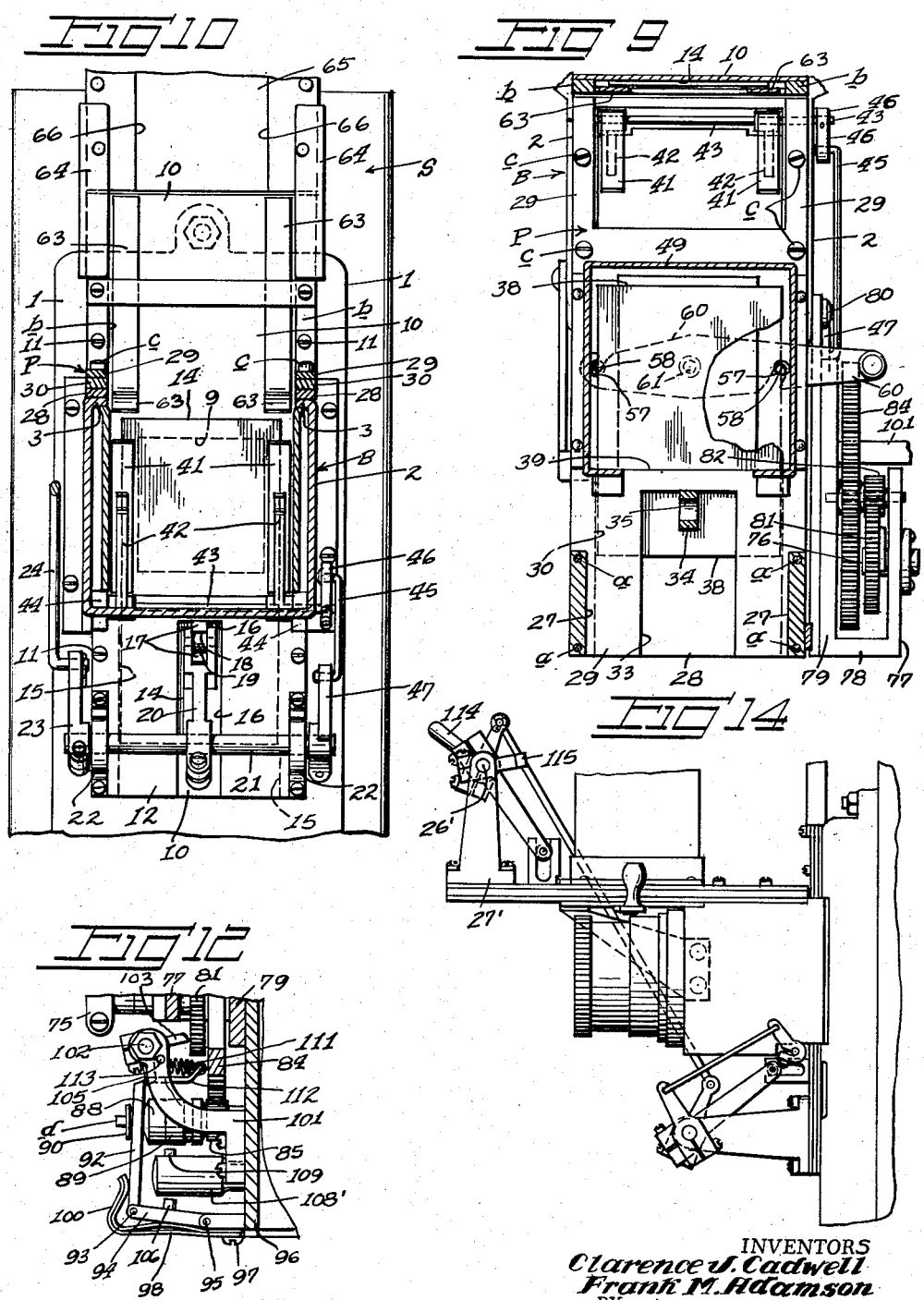

April 15, 1952
C. J. CADWELL ET AL
2,593,007
SLIDE FEEDING MECHANISM FOR STILL
PICTURE PROJECTION MACHINES
Filed Feb. 9, 1949
6 Sheets-Sheet 6
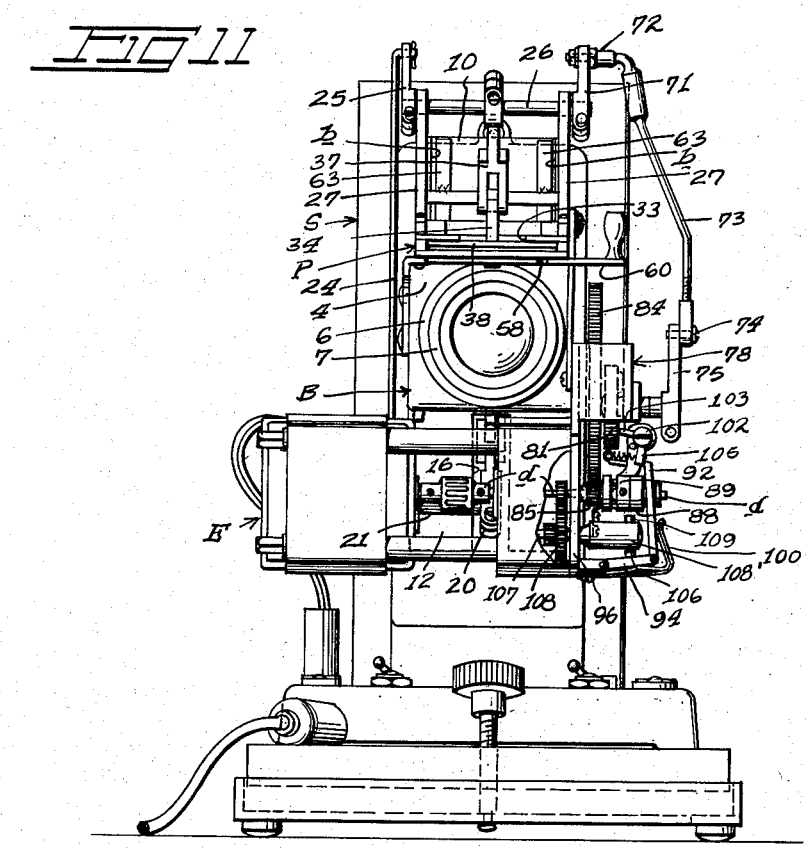
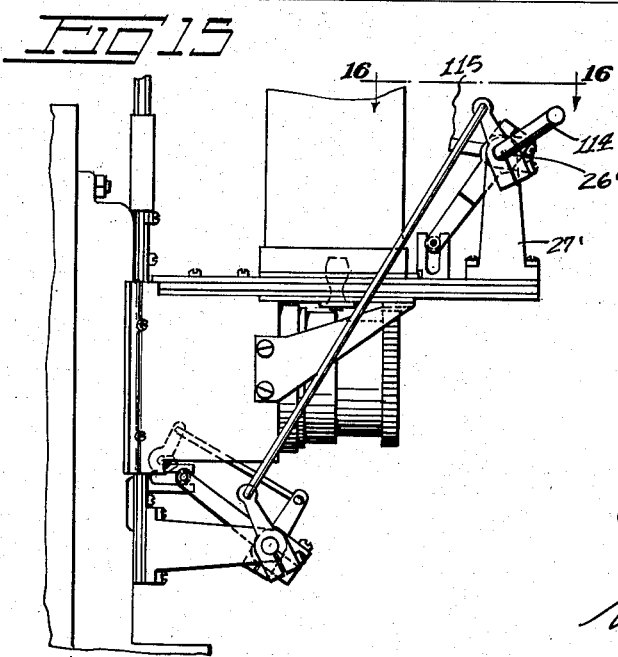
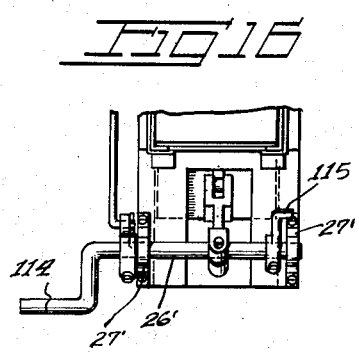
INVENTORS
Clarence J. Cadwell
Frank M. Adamson
BY
*Attorney*

Patented Apr. 15, 1952

2,593,007

UNITED STATES PATENT OFFICE 2,593,007

SLIDE FEEDING MECHANISM FOR STILL PICTURE PROJECTION MACHINES

Clarence John Cadwell, Carpinteria, and Frank M. Adamson, Los Angeles, Calif.

Application February 9, 1949, Serial No. 75,408

5 Claims. (Cl. 88—28)

1

This invention relates to a slide feeding mechanism for still picture projection machines and it is primarily an object of the invention to provide a mechanism of this kind whereby slides are intermittently delivered into position for projection and then after projection the slides are returned to position to again be delivered in proper sequence for projection.

It is also an object of the invention to provide a mechanism of this kind including a magazine from which slides are intermittently delivered into position for projection and wherein after projection the slide is returned to the magazine.

A further object of the invention is to provide a mechanism of this kind including a shutter for interrupting the light beam of slide changing and which shutter also provides a means for moving out of position a projector slide.

An additional object of the invention is to provide a mechanism of this kind whereby slides are intermittently delivered into position for projection together with a shutter intermittently operating in desired sequence to shift a slide out of projecting position and to cut off the light beam during substantially the entire period between change of succeeding slides.

The invention also has for an object to provide a mechanism of this kind including a magazine to contain a change of slides to be discharged intermittently and successively from one end portion of the magazine into position for projection and wherein each of the slides after projection is returned to the magazine at the opposite end portion to be again discharged in proper sequence from the magazine.

The invention consists in the details of construction and in the combination and arrangement of the several parts of our improved slide feeding mechanism for still projection machines whereby certain advantages are attained, as will be hereinafter more fully set forth.

In order that our invention may be better understood, we will now proceed to describe the same with reference to the accompanying drawings, wherein:

Figure 1 is a side view in side elevation; with a portion broken away, illustrating a slide feeding mechanism constructed in accordance with an embodiment of the invention;

Figure 2 is a view in side elevation opposite to Figure 1;

Figure 3 is a vertical sectional view taken through the apparatus as illustrated in Figure 1, with portions broken away;

Figure 4 is an enlarged fragmentary view in front elevation;

2

Figure 5 is a fragmentary detail sectional view taken substantially on the line 5—5 of Figure 4;

Figure 6 is a view similar to Figure 5 but showing certain of the parts in a second position;

Figure 7 is a sectional view taken substantially on the line 7—7 of Figure 5;

Figure 8 is a sectional view taken substantially on the line 8—8 of Figure 6;

Figure 9 is an enlarged fragmentary section view taken substantially on the line 9—9 of Figure 1;

Figure 10 is an enlarged detail sectional view taken substantially on the line 10—10 of Figure 1;

Figure 11 is a front elevational view with parts omitted;

Figure 12 is a detail sectional view taken substantially on the line 12—12 of Figure 6;

Figure 13 is a fragmentary view in elevation of the lower portion of the magazine as here embodied;

Figure 14 is a fragmentary view in side elevation of a modified form of the invention;

Figure 15 is a fragmentary view in side elevation opposite to Figure 14; and

Figure 16 is a detail in top plan substantially as indicated by the line 16—16 of Figure 15.

In the embodiment of the invention as illustrated in the accompanying drawings S denotes the shell or casing of a still picture projection machine from the forward end wall 1 of which projects the lens barrel or box B herein disclosed as having the vertical and parallel side walls 2 with the inwardly disposed flanges 3 at the top of the walls 2. The front wall 4 is provided with a lens opening 5 of desired diameter defined by an outstanding collar 6 into which the lens assembly 7 threads.

The forward wall 1 of the shell or casing S is provided with the usual rectangular opening 8 communicating with the interior of shell or casing S and in proper alignment with the lens opening 5.

In register with the opening 8 and of substantially the same dimensions is a rectangular opening 9 disposed through an intermediate portion of a flat plate 10 overlying the outer face of the forward end wall 1 of the shell or casing S and removably held thereto by the screws 11 or the like. The portion of the plate 10 beneath the opening 9 has disposed thereover and slightly spaced therefrom a plate 12 whereby is provided, with the plate 10, a guide for the flat shutter plate 14. The plates 10 and 12 are maintained in required spaced relation by the interposed strips 15 extending along the side marginal portions of the plates 10 and 12. These side strips are spaced apart a distance greater than the width of the opening 9 and the shutter plate 14 snugly fits between the strips 15. When the shutter plate 14 is in its raised position it effectively closes the opening against the passage of a light beam therethrough from the usual lamp (not shown) in the shell or casing S.

The lower portion of the plate 12 at its vertical center is provided with a slot 16 extending lengthwise thereof and said slot is open at its lower end. Carried by the lower portion of the shutter plate 14 is an outstanding lug 17 which freely moves up and down in the slot 16 as the shutter plate 14 moves upwardly or downwardly or into closed or open position.

The lug 17 is provided transversely therethrough with a slot 18 extending lengthwise of the lug 17 in which engages a pin 19 carried by the outer or free extremity of an inwardly disposed rock arm 20. The rock arm 20 is carried by a shaft 21 rotatably engaged through the outer end portions of the bearing posts 22 rigidly carried by the lower corner portions of the plate 12.

An extended extremity of the shaft 21 carries a second inwardly directed rock arm 23 with which is operatively engaged the lower end portion of an elongated rod 24. This rod 24 has its opposite or upper end portion operatively engaged with an inwardly disposed rock arm 25 carried by a shaft 26. This shaft 26 is rotatably disposed through upper extremities of the upstanding bearing posts 27 carried by the outer end portion of substantially horizontally disposed elongated platform P and secured thereto by screws $a$, as shown in Figures 1 and 2. This platform P, as herein disclosed in Figures 9 and 10, is secured by the screws $c$ to the flanges 3 and comprises two overlying plates 28 and 29 maintained in slight spaced relation by the interposed strips 30 extending along the longitudinal marginal portions of the plates 28 and 29. These plates 28 and 29 at their inner ends are provided with the extended arms 31 spaced apart to overlie the top edges of the side walls 2 and detachably held thereto by the screws 11 or the like. The inner portions of the plates 28 and 29 also preferably slightly overlie the forward portion of the top of the barrel or box B and are detachably held to the upper plate 29 and its arms 31 by the screws 11 or otherwise as preferred.

The rear portion of the upper plate 29 of the platform P at the transverse center thereof is provided with a longitudinally disposed slot 33 open at its outer end. Traveling within this slot is an upstanding lug 34 carried by a shifting plate 38 and having a longitudinally directed slot 35 disposed transversely therethrough. Working in this slot 35 is a pin 36 carried by the lower or free end portion of a rock arm 37 which is rigidly secured at its upper end to the shaft 26 and extends downwardly and rearwardly.

The plate 38 is snugly engaged between the plates 28 and 29 and travels inwardly across an opening 39 in the end portion of the upper plate 29 in close proximity to the lens barrel or box B. This opening 39 is of substantially the same contour and dimensions as a picture slide 40 through which opening 39 the picture slide 40 freely drops upon the bottom plate 28 of the platform P when the shifting plate 38 is fully retracted. As the shifting plate 38 moves inwardly it contacts the picture slide 40 and discharges the same into the barrel or box B. As the slide passes out from between the plates 28 and 29 it drops on the bow spring fingers 41, carried by the outer portions of the rock arms 42, which at that time are at the limit of their outward movement from the shutter plate 14. These fingers 41 are relatively light and are disposed downwardly on predetermined inclines and terminate closely adjacent to the front wall 1 of the shell or casing S near the lower part of the opening 9.

As the picture slide 40 passes over the fingers 41, the weight of the slide 40 will result in the same dropping in proper upright edge position flat against the outer face of the plate 10 and in a position with respect to the opening 9.

As the picture slide 40 is moving into position with respect to the opening 9, the arms 42 bring the fingers 41 into clamping contact with the side or end marginal portions of the picture slide 40. These arms 42 are fixed to a rock shaft 43 rotatably supported by the bearings 44 placed at the inner lower corner of the barrel or box B. The arms 42 are moved into and out of working position in required timed sequence through the medium of a pitman 45 operatively engaged at one extremity with an upstanding rock arm 46 carried by an extended portion of the shaft 43 and operatively engaged at its opposite extremity with an upstanding rock arm 47 carried by an extended end portion of the shaft 21.

The plate 29 is provided with the upstanding flanges 49 between which is snugly received the lower portion of a magazine M for the picture slides 40. This magazine is of the required dimensions to hold a stack of picture slides 40 and which stack rests upon and is supported by the inwardly disposed flange 50 carried by the lower extremities of the side walls 51 of the magazine. The front wall 52 and the rear wall 53 of the magazine M each terminate a slight distance above the lower ends of the side walls 51 to provide an entrance 54 for the shifting plate 38 and an exit 55 for a picture slide 40.

The central portions of the flange 50 have depending therefrom the pins 56 which, when the magazine is placed in working position, pass down and through the openings 57 disposed in required positions through the bottom plate 28 of the platform P. The pins 56 are of a length to extend below the platform P and said extended portions are provided therearound with the grooves 59 in which engage through the medium of the open slots 58, the locking member 60. This member 60 underlies the platform P and is pivotally held thereto, as at 61, at a point substantially midway the plate 28. One end portion of the member 60 is formed to provide an operating element.

The portion of the plate 10 above the opening 9 is provided along its side margins with the outstanding guide flanges or cleats $b$ between which a picture slide 40 is upwardly forced by the shutter plate 14 moving upwardly into closed position in required timed sequence.

Connected to the central portions of the flanges $b$ and bridging the space therebetween is a cross bar 62 to the end portions of which are secured the upwardly and downwardly disposed resilient fingers 63 for frictional contact with the side marginal portions of a raised picture slide 40 to hold the same against dropping as the shutter plate 14 moves downwardly and a succeeding picture slide takes its position over the opening 9.

Detachably engaging the upper portion of the plate 10 as by the slip sockets 64, is the lower end portion of an elongated elevator plate 65. The plate 65 is of a length to permit the chute C depending outwardly and downwardly therefrom to properly discharge picture slides into the upper end portion of the applied magazine. The longitudinal side margins of the elevator plate 65 are provided with the inwardly facing guide grooves 66 in which the side marginal portions of the picture slides 40 travel.

As a picture slide 40 is forced out at the top of the elevator plate, the slide will be caused to properly fall over upon the chute C by contact with the deflector member 67. As herein disclosed this member comprises a flat plate of relatively light weight and having a lower marginal portion hingedly connected at 68, to a bracket 69 extending outwardly from the top portion of the elevator plate 65 at the side thereof remote from the chute C. This deflector or plate 67 normally is inclined downward across the top of the elevator plate 65 by the resilient arm 70 carried by the upper portion of the elevator plate 65. When the deflector or plate 67 bears outwardly against the arm 70 said arm will be put under sufficient tension to throw the deflector or plate 67 back to its normal position after being relieved of the lifting pressure.

It is to be noted that the shaft 26 is the operating shaft for the various movable parts and the same may be either manually or power operated. It is also to be understood that each cycle of operation for the feeding of each slide 40 is effected upon each complete revolution of the shaft 26.

In the embodiment of the invention as illustrated in Figures 1 to 13, the shaft 26 is motor driven and the rotation is intermittent with the time between rotation of the shaft 26, being determined by the length of time it is desired to maintain a slide 40 in projecting position.

In the present embodiment, the extremity of the shaft 26 remote from the rod 24, is provided with a rock arm 71, with which is operatively connected, as at 72, an end portion of a pitman 73. The opposite end portion of the pitman 73 is operatively connected, as at 74, with a rock arm 75. This arm 75 is fixed to rotate with a shaft 76 rotatably mounted through an outer bearing plate 77 carried by a bracket 78, the inner plate 79 having an end portion secured as at 80, to an adjacent side wall 2 of the barrel or box B. This bracket 78 extends a desired distance forward from said barrel or box B.

The shaft 76 has fixed to its inner extremity and immediately adjacent to the inner face of the plate 77, a pinion 81 which meshes with the smaller pinion 82 rotating with the shaft 83 supported by and bridging the space between the plates 77 and 79. Also fixed on the shaft 83, is a large gear 84, which meshes with a pinion 85 which is freely mounted on the drive-shaft $d$ of an electric motor E. Extending outwardly from the pinion 85 are the clutch pins 86, herein disclosed as two in number and diametrically opposed. Coacting with the pins 86 are the inwardly directed pins 87 carried by the clutch member 88 keyed to the shaft $d$ and freely moving lengthwise thereof. The pins 87 are of a length to enter at all times into the openings A provided in the sleeve 89 fixed to the shaft $d$ between the pinion 85 and the clutch member 88. The pins 87 are also preferably two in number and diametrically opposed and the sleeve 89 is spaced outwardly from the pinion 85 to be free at all times of the pins 86. The outer end of the clutch member 88 is provided at its axial center with an outstanding neck 90 having therearound a peripheral groove 91 whereby the clutch member 88 is operative with a button-hole slot 80 extending lengthwise of an upstanding rock lever 92.

The lower portion of the lever 92 is pivotally connected as at 93, with the outer free extremity of a leaf 94 hingedly connected, as at 95, to the lower portion of a plate 96 depending from the inner arm 79 of the bracket 78. Secured as at 97, to the plate 96 below the leaf 94, is a spring 98 which yieldingly holds the leaf 94 at the limit of its upward movement as determined by contact of the leaf 94 from below with the outstanding stop member 99 carried by the plate 96 at a desired distance above the leaf 94.

The outer extremity of the spring 98 is continued by an upwardly disposed spring extension 100 which bears outwardly against the lever 92 whereby the clutch member 88 is resiliently held at the limit of its inward movement as determined by contact of the member 88 with the sleeve 89. When the member 88 is at the limit of its inward movement, the outer or free extremities of the pins 87 are extended sufficiently far beyond the inner face of the sleeve 89 to have contact with the pins 86 so that the gear 84 and shaft 83 will operate in unison.

Extending outwardly and upwardly from the plate 96 and overlying from below the gear wheel 84 is a bearing post 101 and rotatably engaged and supported by the upper portion of this post is a rock shaft 102 which is disposed in a plane substantially parallel to the adjacent face of the gear wheel 84. The rock shaft 102 carries an inwardly directed rock finger 103 which terminates closely adjacent to the lower portion of the outer face of the gear 84 and in the path of travel of the face cam 104. As the gear wheel 81 completes a revolution the face cam 104 will depress the rock finger 103 to rock the shaft 102 sufficiently to cause a rock arm 105 depending from the shaft 102 to contact from within the upper extremity of the lever 92 to move the same outwardly the distance required to shift the member 84 to bring the pins 87 carried out of the path of travel of the pins 86 of the pinion 85 to stop rotation of the gear wheel 84. This stopping of the gear wheel 84 occurs at substantially the time a slide 40 is received in position for projection.

Extending upwardly from the leaf 94 is a chamfered pin 106 which is radial to a drum 108' positioned above the leaf 94 and carried by a shaft 107 in driven connection, as at 108, with the shaft $d$. In the present instance the gear ratio is such as to effect a single rotation of the shaft 107 with each revolution of the gear wheel 84.

Extending outwardly and radially from the drum 108' fixed for rotation with the shaft 107, is a cam pin 109, which upon each revolution of the shaft 107 will contact from above the pin 106 and depress the leaf 94 sufficiently to free the lever 92 from the rock arm 105 whereupon the clutch member 88 moves inwardly a distance sufficient to bring the pins 87 into the path of the pins 86 whereupon the gear wheel 84 will be rotated to effect the removal of a slide from projecting position and returned to the magazine and also deliver the next slide into projecting position.

The inward movement of the clutch member 88 under the action of the lever 92 is effected by the extension spring 100.

The rock arm 102 is normally and resiliently held at the limit of its upward movement and in desired position with respect to the cam 104 by a retractile coil spring 111 having one end portion secured to the rock arm 105 and its opposite extremity secured to the free end portion of an inwardly disposed bracket arm 112 carried by the post 101. The inward movement of the rock arm 105 is limited by contact of the rock arm with a stop pin 113 carried by the post 101.

In the embodiment of the invention, as illustrated in Figures 14, 15 and 16, the mechanism is substantially the same as previously described except that such mechanism is manually operated. The main operation shaft 26' of the mechanism has one end portion provided with a conventional hand crank 114. This crank 114 permits the desired oscillation of the shaft 26' and the extent of movement of the outward or retracting rotation of the shaft 26' is limited by contact of a stop arm 115 carried by the shaft 26' with one of the bearing posts 27' for the shaft. It is believed obvious the retraction rotation of the shaft 26' is that movement which effects the desired outward movement of the plate 38'.

We claim:

1. In a still picture projection machine, including a light housing having a wall provided with a light window, a picture slide changing mechanism comprising a box secured to said wall over said window and formed to have light pass therethrough from the window, a lens tube at the opposite side of the box from the window, the box having a top opening, a picture slide frame surrounding the window, a pair of arms within the box and pivoted to swing toward and away from the frame on a common horizontal axis extending across the box at the bottom of the window, said arms being at opposite sides of the frame and having a vertical slide holding position and a slide receiving position in which they are inclined away from the window below the box top opening, a reciprocating shutter plate for covering the frame, means for moving said plate, a slide magazine for supporting a vertical stack of horizontal slides at one side of the box top opening, pusher means for moving a slide from the bottom of the stack for discharge downwardly through the box top opening onto said arms when the latter are in slide receiving position, a vertical slide guide means extending up from the top of the frame, said shutter plate being positioned to effect the shifting of a slide from the frame into said guide means when moving to frame covering position, and means at the top of said guide means for turning an elevated slide down from a vertical position into the magazine in a horizontal position.

2. In a still picture projection machine of the character stated in claim 1, spring slide gripper fingers disposed at opposite sides of said guide means directly above the frame beneath which a slide is moved by the shutter plate and held against retrograde movement upon retraction of the plate.

3. A still picture projection machine of the character stated in claim 1, in which said guide comprises a pair of spaced grooves in which opposite edges of the slide engage, a receiver into which a slide passes from said grooves, said receiver including an inclined bottom leading into the top of the magazine, and spring pressed deflector means at the upper ends of the guide grooves for effecting the said turning down of an elevated slide onto the inclined bottom of said receiver.

4. In a still picture projection machine including a light housing having a wall provided with a light window, a picture slide changing mechanism comprising a slide receiving box secured to said wall over the window, a lens tube in the wall of the box opposite from the window, the box having a top opening, a platform mounted horizontally on the top of the box and comprising spaced top and bottom plates, the bottom plate having a picture slide discharge opening coinciding with the box top opening and the top plate having a slide opening forwardly from the bottom plate opening, a magazine for supporting a stack of picture slides horizontally, a pusher slidably supported between said plates for shifting a bottom slide from the stack to the box top opening, a slide frame in front of said window, a pair of slide receiver arms in the box at opposite sides of the frame and pivoted to swing on a common horizontal axis toward and away from the frame, said arms having a substantially vertical position in which they hold a slide in the frame and an upwardly and outwardly disposed inclined position below the box opening in which they receive a slide from said box opening, means for swinging the arms to said vertical position to stand a slide vertically in the frame, a vertically shiftable shutter plate for covering the window, means for shifting said shutter plate from below the window upwardly to cover the latter, the upward movement of the shutter plate effecting upward movement of the slide from the frame to a position thereabove, and guide means extending upwardly from above the frame to receive the slides and return them to the magazine.

5. A still picture projection machine of the character stated in claim 4, with a pair of rock shafts supported in substantially parallel relation with the rocking axis for said arms, a lever secured to each rock shaft, one of said levers being coupled with said pusher and the other lever being coupled with said shutter plate, an operative coupling between the shafts whereby the same may be rocked in unison, and means for effecting the rocking of the shafts, said levers being relatively positioned whereby said pusher is retracted preparatory to shifting a slide from the plate to the box top opening when the shutter plate is advanced to window covering position and said arms are in slide receiving position.

CLARENCE JOHN CADWELL.
FRANK M. ADAMSON.

REFERENCES CITED

The following references are of record in the file of this patent:

UNITED STATES PATENTS

| Number | Name | Date |
|---|---|---|
| 590,903 | Newman | Sept. 28, 1897 |
| 720,099 | Barbour | Feb. 10, 1903 |
| 1,165,318 | Carver | Dec. 21, 1915 |
| 1,247,608 | Alguire | Nov. 27, 1917 |
| 1,443,711 | Lauchly | Jan. 30, 1923 |
| 2,363,820 | Warriner | Nov. 28, 1944 |
| 2,412,246 | Blumenstein | Dec. 10, 1946 |
| 2,427,164 | Stechbart | Sept. 9, 1947 |
| 2,503,239 | Antos | Apr. 11, 1950 |

FOREIGN PATENTS

| Number | Country | Date |
|---|---|---|
| 219,446 | Switzerland | May 16, 1942 |